United States Patent
Rodero Antunez

(10) Patent No.: US 6,311,456 B1
(45) Date of Patent: Nov. 6, 2001

(54) HIGH-DENSITY GLASS WOOL RIGID PANEL

(75) Inventor: D. Carlos Rodero Antunez, Madrid (ES)

(73) Assignee: Isover Saint-Gobain (FR)

(*) Notice: Subject to any disclaimer, the term of this patent is extended or adjusted under 35 U.S.C. 154(b) by 0 days.

(21) Appl. No.: 09/447,868

(22) Filed: Nov. 23, 1999

(30) Foreign Application Priority Data

Nov. 26, 1998 (ES) .................................. 9802983 U

(51) Int. Cl.⁷ ........................................................ E04C 2/34
(52) U.S. Cl. ..................... 52/794.1; 52/783.1; 52/792.1; 52/793.1; 52/800.11; 52/406.1; 52/309.15; 52/309.9; 52/309.14; 428/74; 428/75
(58) Field of Search .................................. 52/794.1, 202, 52/783.1, 791.1, 792.1, 793.1, 800.1, 800.11, 800.12, 802.1, 406.2, 406.1, 309.9, 309.14, 309.15; 428/74, 76, 75

(56) References Cited

U.S. PATENT DOCUMENTS

| | | | |
|---|---|---|---|
| 3,948,347 | * 4/1976 | Rutledge | 181/33 G |
| 4,104,840 | * 8/1978 | Heintz et al. | 52/309.9 |
| 4,161,567 | * 7/1979 | Sturgeon | 428/594 |
| 5,625,999 | * 5/1997 | Buzza et al. | 52/793.11 |
| 5,765,318 | * 6/1998 | Michelsen | 52/98 |
| 6,037,033 | * 3/2000 | Hunter | 428/72 |
| 6,141,930 | * 11/2000 | Allwein et al. | 52/404.1 |

* cited by examiner

*Primary Examiner*—Carl D. Friedman
*Assistant Examiner*—Jennifer I. Thissell
(74) *Attorney, Agent, or Firm*—Cowan, Liebowitz & Latman, P.C.; Michael I. Wolfson

(57) ABSTRACT

An improved high-density glass wool rigid panel for use in the construction of air distribution ducting in air conditioning and heating installations of the sort made of a box-shaped high-density glass wool body with optional glass fiber reinforcing mesh is disclosed. The rigid panel is formed with a step on opposite sides, covered with aluminum strips on the larger surfaces, wherein there is an overlap of said aluminum strips on step running right around its smaller side.

5 Claims, 1 Drawing Sheet

HIGH-DENSITY GLASS WOOL RIGID PANEL

BACKGROUND OF THE INVENTION

This invention relates to an improved high-density glass wool rigid panel whose utility is to permit the construction of air distribution ducting in air conditioning and heating installations.

The invention represents an improvement over standard rigid glass fiber panels in so far as it incorporates constructive features allowing the panels used to design the air distribution conducts to be perfectly joined up.

This invention applies in the industry manufacturing elements and devices used in air conditioning and heating installations, specifically that manufacturing air ducting used to distribute air in such air conditioning and heating installations.

The applicant is aware of the existence and common use of air distribution ducting in air conditioning and heating installations, designed to move a given air flow from the equipment providing such air in suitable conditions of temperature and humidity to the areas to be cooled or heated.

The applicant is in particular familiar with ducting made by joining rigid panels of high-density glass wool in tube shape, to form hollow square or rectangular ducts.

The high-density rigid glass wool panels enable ducting of very low thermal conductivity to be made, incorporating a reinforcing glass fiber mesh to provide rigidity and allow large-area ducting to be built which can carry large air flows at static pressures of up to 80 mm. h.w.

In the design of high-density glass wool panels for air ducting, the air flow must not come into contact with the wool: this may drag glass thread into the air, soiling it, so that the panel has to be covered with some form of neutral barrier which will prevent that glass thread from contaminating the air.

The applicant is aware of a variety of coatings to prevent contact between the air flow and the high-density glass wool forming the panels defining the ducting and, in particular, is aware of strip aluminum coating containing the high-density glass wool and the reinforcing glass fiber mesh, so that the air is unable to drag off said glass thread, and flow load loss is also reduced.

Rigid high-density glass wool panels also exist with steps on opposite sides of their parallelpiped box form, to make it easier to join said panels, increasing the mechanical strength of the design and so making larger ducting possible with lower load loss than those made of box-shaped panels without this feature.

This design of high-density glass wool rigid panel forms a"sandwich" where the two aluminum strips cover two reinforcing glass fiber meshes which strengthen a tabular high-density glass wool body with steps on opposite sides, the two larger surfaces being covered.

SUMMARY OF THE INVENTION

The improved high-density glass wool rigid panel which is the subject of these Specifications is clearly new in its field of application, since one of the box-shaped body's steps is completely coated in high-density glass wool.

Specifically, the invention comprises a conventional box-shaped high-density glass wool panel with steps on opposite sides, strengthened with glass fiber mesh and covered in a glass fiber mesh and aluminum strip on one of its larger surfaces, and by a glass fiber mesh and a second aluminum strip on the other large surface, running rigs around one of the steps on the invention with the two aluminum strips overlapping in this area.

BRIEF DESCRIPTION OF THE DRAWINGS

To complete this description and assist in a better understanding of the features of the invention, this specification is accompanied by a sheet of drawings forming an integral part hereof which, by way of illustration and without limitation, showing the following.

DESCRIPTION OF THE PREFERRED EMBODIMENT

Figure 1:
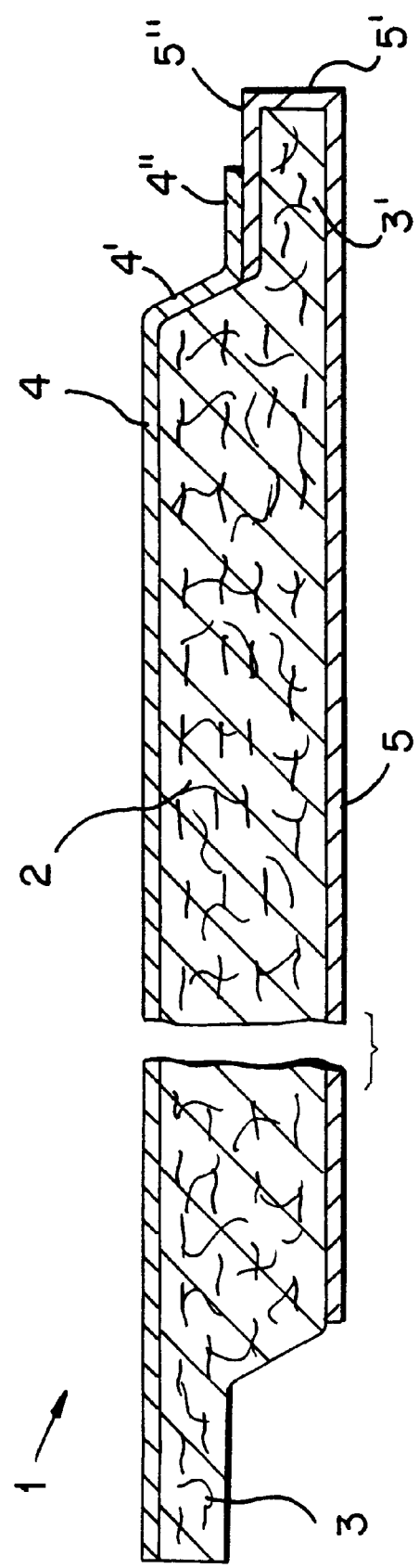
FIG. 1 is a cross-section of a high-density glass wool rigid panel constructed and arranged in accordance with the invention, showing the constituent elements and layout of the improved high-density glass wool rigid panel.

FIG. 1 shows how this improved high-density glass wool rigid panel 1 is formed by a box-shaped high-density glass wool body 2 which may incorporate optional glass fiber reinforcement. Panel 1 includes steps 3 and 3' at opposite ends and aluminum strips 4 and 5 covering the larger surfaces. Aluminum strips 4 and 5 overlap at step 3'.

FIG. 1 also shows how on one end of aluminum strip 5 there is a 90° right angle shape 5' followed by a further right angle shape 5" to provide a protective area at one end of body 2 which forms the overlap.

Also, coinciding with that end, panel 4 has a gradual incline or semi-vertical shape 4' followed by a further form or bend 4" which sits parallel with form 5" of aluminum strip element 5.

It is not felt necessary to extend this description in order for any expert in the field to grasp the scope of the invention and the benefits arising from it.

The materials, form, size and arrangement of the elements may vary provided that this does not alter the essential nature of the invention.

The terms of the specification must always be interpreted broadly, without limitation.

What is claimed is:

1. An improved high-density glass wool rigid panel for use in the construction of air distribution ducting in air conditioning and heating installations, comprising a box-shaped high-density glass wool body having two opposed substantially planar large surfaces and opposed side edges joining the large surface with two opposite sides forming ends, each said opposed end having a step region extending from one of the opposite large surfaces, each large surface having aluminum strips disposed thereon and at one end of the panel with an overlap of said aluminum strips on the one step region extending over the associated end to overlap the aluminum strip on the opposite side of the step region extending over the opposite side of the step region.

2. The improved high-density glass wool rigid panel as set forth in claim 1, wherein the end of the aluminum strip has a vertical form at a 90° angle to the panel's longer section or aluminum strip element, and the upper end of the vertical area has a horizontal extension parallel to the longer part of the strip element to form the overlap in the step region.

3. The improved high-density glass wool rigid panel as set forth in claim 1, wherein the aluminum panel or strip has an inclined semi-vertical region at one end followed at the bottom by an extension horizontal and parallel to the aluminum panel on the large surfaces.

4. The improved high-density glass wool rigid panel as set forth in claim 2, wherein the aluminum panel or strip has a semi-vertical form at one end followed at the bottom by an extension horizontal and parallel to the aluminum panel on the large surfaces.

5. The improved high-density glass wool rigid panel of claim 1, wherein the high-density glass wool panel further includes glass reinforcing mesh disposed between the glass wool body and the aluminum strips on the large planar surfaces of the glass wool body.

* * * * *